United States Patent [19]

Pauwels et al.

[11] 4,138,632
[45] Feb. 6, 1979

[54] PULSE WIDTH MODULATOR DIGITAL SERVO SYSTEM

[75] Inventors: Michael A. Pauwels, Kalamazoo; Sydney K. Tew, Portage, both of Mich.

[73] Assignee: Pneumo Corporation, Boston, Mass.

[21] Appl. No.: 784,335

[22] Filed: Apr. 4, 1977

[51] Int. Cl.² .............................................. G05B 11/28
[52] U.S. Cl. .................................... 318/599; 318/341; 332/9 R
[58] Field of Search ...................... 318/599, 341; 332/9

[56] References Cited

U.S. PATENT DOCUMENTS

| | | | |
|---|---|---|---|
| 3,516,331 | 6/1970 | Oelrich et al. | 318/599 X |
| 3,950,682 | 4/1976 | Dohanich, Jr. | 318/341 X |
| 3,997,855 | 12/1976 | Nash | 332/9 R |
| 4,064,443 | 12/1977 | Yamada | 318/341 X |

Primary Examiner—B. Dobeck
Attorney, Agent, or Firm—Maky, Renner, Otto & Boisselle

[57] ABSTRACT

A pulse width modulator digital servo system combines a digital feedback signal, which is developed in response to a time based signal directly indicative of a positional physical parameter of a servo actuator, and a digital command signal, which is indicative of a desired position of the servo actuator, to produce a digital resultant signal. A pulse width modulator produces a control signal output that is pulse width modulated in accordance with the digital value of the resultant signal to control operation of the servo actuator to achieve the positional relationship commanded. The pulse width modulated control signal is balanced when the combined resultant signal has a predetermined or constant value and is unbalanced in respective directions depending on whether the combined resultant signal is larger or smaller than such predetermined value.

42 Claims, 11 Drawing Figures

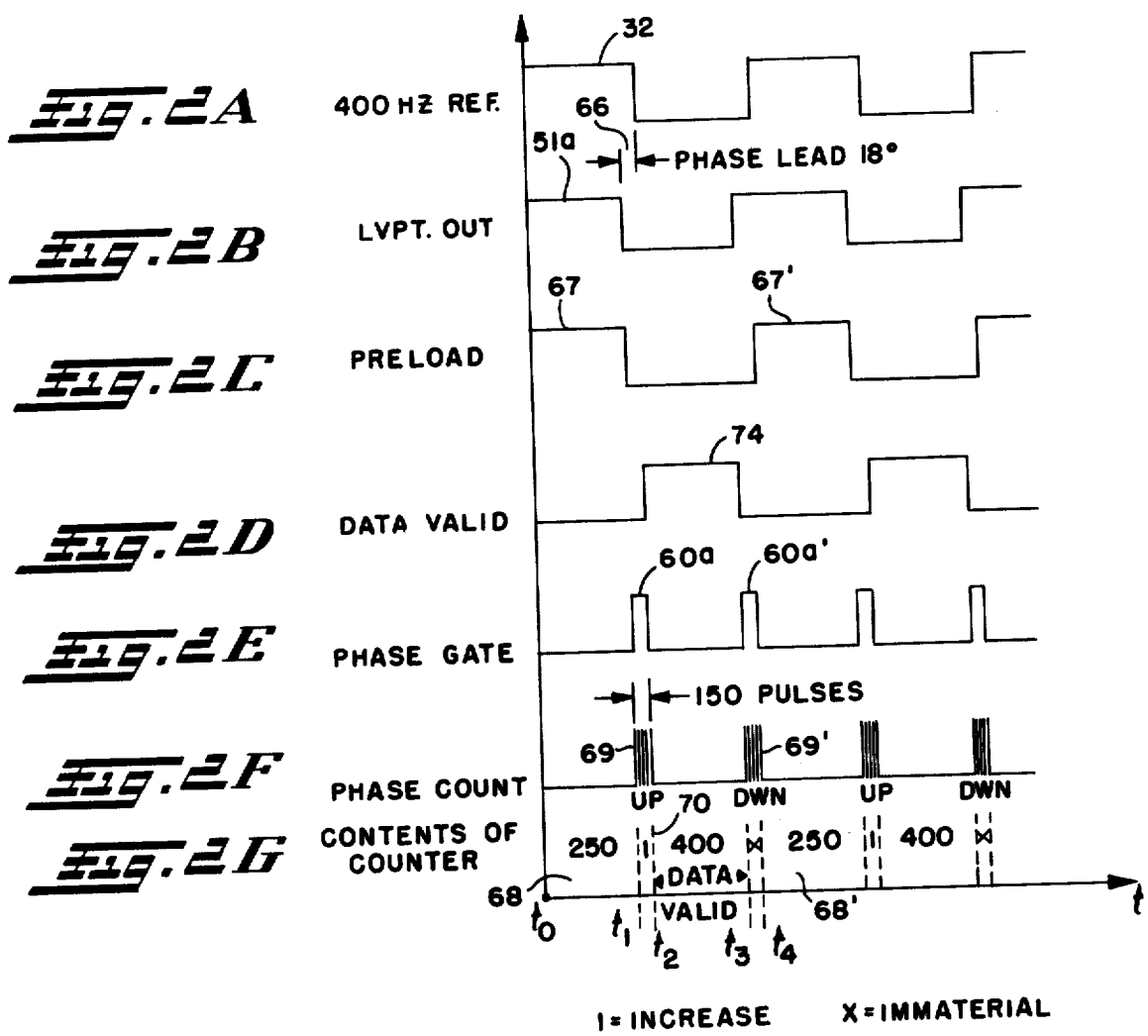
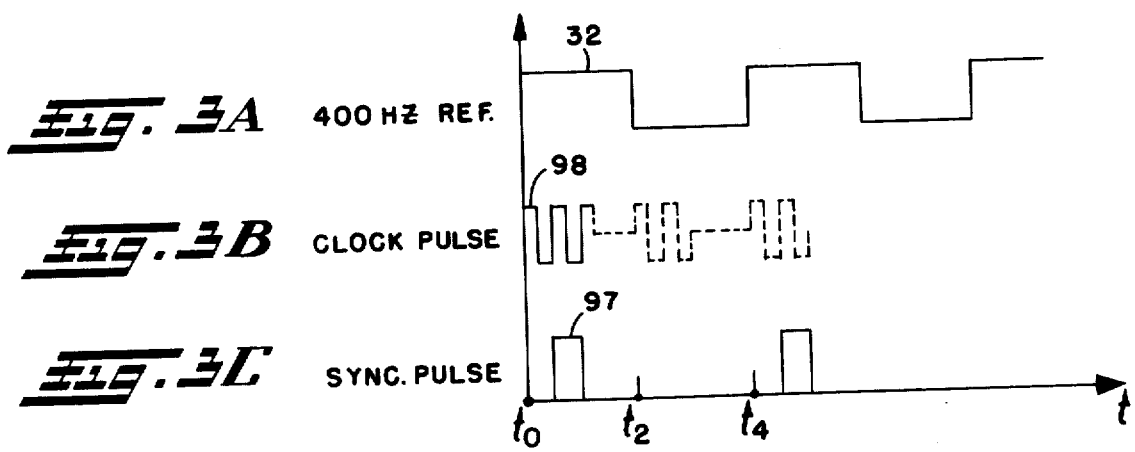

PULSE WIDTH MODULATOR DIGITAL SERVO SYSTEM

BACKGROUND OF THE INVENTION

The present invention relates generally, as indicated, to a pulse width modulator digital servo system and, more particularly, to such a system that combines the high resolution of an analog input with the advantages of convenient data manipulation and monitoring, noise immunity, and the like of a digital system for accurate output control function usually without any additional analog to digital (A/D) or digital to analog (D/A) converters.

One type of analog transducer that may be conveniently utilized with the invention is a linear variable phase transformer (LVPT) that may be used with a digital phase detector to produce positional information in a digital format, for example, as described in copending U.S. patent application Ser. No. 758,654, filed Jan. 12, 1977, for "Linear Variable Phase Transformer", which application is assigned to the same assignee as the present application.

Conventional analog transducers usually include potentiometers, which may directly insert inaccuracies into output information, and linear variable differential transformers (LVDT), which require costly A/D converters to produce digital outputs to facilitate interfacing with conventional digital equipment, etc. These converters, of course, increase the cost of a servo system.

The LVPT employed in the present invention is a phase modulator and, as such, has substantially infinite resolution in providing an absolute, time-based response. The ultimate resolution of the output information in accordance with the digital system of the invention, as will be described below, is limited only by the ratio of the digital clock frequency and the LVPT excitation frequency. In contrast, typical analog transducers employed in a servo system or the like have their digital resolution limited by the A/D converter by which they are interfaced to the servo system or other digital system. Moreover, conventionally to increase from 8 bit resolution to 12 bit resolution may be relatively expensive in A/D converters, but is appreciably less expensive in the phase modulated system of the present invention. Additionally, the phase modulated system of the invention offers higher immunity to noise and other types of interference.

Two types of direct digital encoders, namely, the absolute and the incremental digital encoders, are available that do not require A/D conversion. However, to obtain a high degree of resolution in an absolute digital encoder normally requires an undesirably extremely large number of parallel lines to the electronics; and although incremental digital encoders offer simpler cabling, a small amount of noise often will invalidate the output information therefrom.

SUMMARY OF THE INVENTION

The pulse width modulator digital servo system of the present invention combines the effectively infinite resolution of an analog transducer with the advantages of reliability, system monitoring, failure analysis, convenient data manipulation, interfacing, noise immunity, and the like of a highly resolved digital system for servo control purposes. The system preferably employs an LVPT transducer which has many of the environmental advantages of conventional LVDT's but which provides a phase modulated output that is conveniently directly converted to digital information that is readily manipulated and examined to effect pulse width modulation of a control signal to operate a servo actuator.

The LVPT produces a return signal that is phase modulated with respect to the piston position of the servo actuator, for example. A digital phase detector compares the phase of the return signal, which is a time based relationship, with the phase of a reference signal, which provides a time reference, and generates a digital feedback signal indicative of such comparison and, thus, of the servo actuator piston position. The digital feedback signal is preferably in a binary format that ordinarily facilitates manipulation of the same and, of course, interfacing with other binary equipment, such as digital computers, central processing units (CPU), etc.

The terms digital and binary may be used interchangeably herein with either term implying digital information in binary format, which is employed in a preferred form of the invention. However, although the invention will accordingly be described with regard to such binary representations of digital number values, it will be appreciated that similar techniques within the scope of the invention may be used for operation directly on a decade digital type basis.

A command signal from a digital position command unit, such as a CPU, indicative of a desired position of the servo actuator piston and the feedback signal are combined at a summing junction to produce a digital resultant signal which is stored in a latch.

A pulse width modulator (PWM) receives the resultant signal, which is first shifted to double the same, in a PWM counter. The doubled resultant signal is strobed into the PWM counter by a synchronizing signal which at the same time sets a set-reset flip-flop output device of the PWM. A PWM clock pulse signal counts the PWM counter in a downward direction, and the latter produces a borrow signal upon reaching a predetermined level, such as zero, that resets the output flip-flop. Thus, as it is cyclically set and reset, the output flip-flop produces a control signal, which is pulse width modulated to have extend and retract signal portions of respective durations dependent on the times at which the flip-flop is set and reset, to control an electrohydraulic valve or the like which operates the servo actuator.

In a preferred form the frequency of the PWM clock pulse signal is a multiple of the frequency of the synchronizing signal; therefore, to obtain a balanced output of extend and retract signal portions from the PWM, the digital value of the doubled resultant signal is one half the frequency of the PWM clock pulse signal. Moreover, upon changing the value of the command signal, the output from the PWM will become unbalanced until the servo actuator and the LVPT are moved to a position that effects an equal and opposite change in the value of the feedback signal.

With the foregoing in mind, it is a primary object of the invention to provide a digital servo system which does not require D/A or A/D converters.

A further object is to provide a high degree of resolution in a digital servo system.

Another object is to combine the features of essentially infinite resolution of an analog transducer with the many features of a highly resolved digital servo system.

An additional object is to assure operation and to maintain precision in a digital servo system even in the presence of noise, whereby the system is substantially immune to noise.

Still a further object is to provide in a digital servo system signal information that can be conveniently transmitted with precision by RF carrier or by multiplexed techniques.

Still another object is to facilitate direct interfacing of a digital servo system with a central processing unit or other binary command device, especially without conversion, for control and/or monitoring purposes.

Still an additional object is to provide a digital servo system which utilizes low power, miniaturized MOS (metal oxide substrate) digital components to reduce power requirements, size and cost as well as to maintain reliability.

A further object is to provide a servo actuator system operable over a wide range of temperatures and in relatively hostile environments.

Yet another object is to reduce the number of leads between a servo actuator mechanism, including its transducer, and the electronics of a digital servo system thereby to reduce costs, to increase reliability, etc.

An additional object is to facilitate pulse width modulation of an output signal.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIGS. 2A through 2G and 3A through 3C are graphical representations of signal wave forms occurring in the system of FIG. 1 to facilitate description and understanding of the operation thereof.

DESCRIPTION OF THE PREFERRED EMBODIMENT

Figure 1:
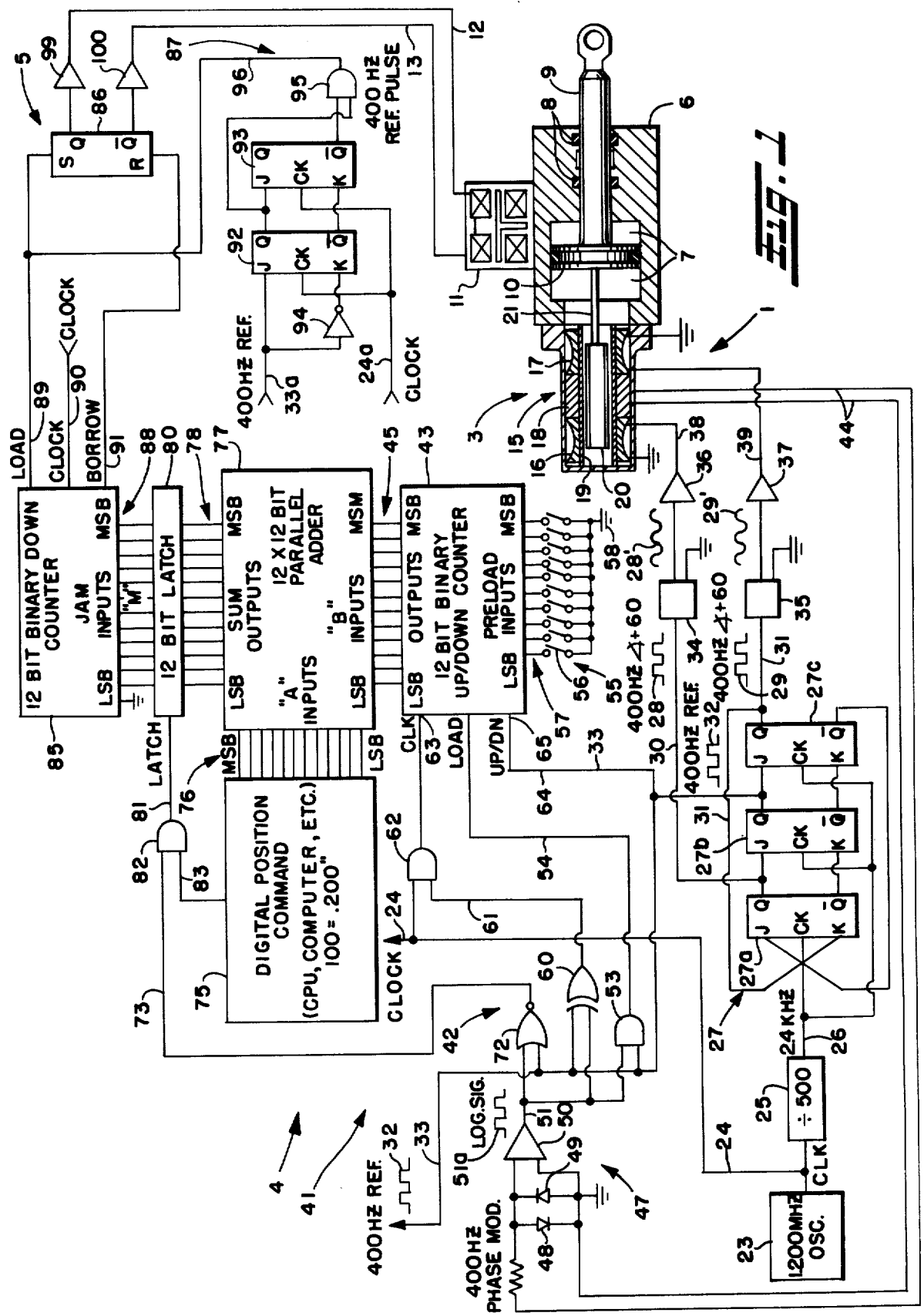
FIG. 1 is a schematic circuit diagram partly in block form and including a partial section view of a servo actuator and LVPT of a pulse width modulator digital servo system in accordance with the invention.

Referring now initially to FIG. 1, a pulse width modulator digital servo system in accordance with the invention is generally indicated at 1. Such system includes a servo actuator 2, which has a variable physical parameter such as a linear positional relationship between movable and fixed portions thereof; a transducer 3, which produces phase modulated information indicative of such parameter; digital circuitry 4, which develops from such phase information and a command input a digital resultant signal indicative of the actual and the desired servo actuator parameter; and a pulse width modulator 5 (hereinafter PWM), which develops a control signal and pulse width modulates the same in accordance with such resultant signal to control the servo actuator parameter.

The servo actuator 2 includes a housing 6 within which is a fluid chamber 7 sealed at one end by cooperating O-rings 8 or the like and output rod 9 and at its other end adjacent the transducer 3 by conventional means, not shown. A piston 10 is movable in the chamber 7 under control of an electrohydraulic valve 11 which controls the fluid pressure on opposite faces of the piston in response to the pulse width modulated electrical control signal applied on the extend and retract lines 12, 13 from the PWM 5. When the PWM is producing an extend signal portion of the control signal, the line 12 will be positive relative to the line 13, for example, and those polarities will be reversed when the retract signal portion is produced. Moreover, as is conventional, when the respective durations of the extend and retract signal portions are equal or balanced, the piston 10 will not move; however, when those durations are unequal, the control signal will be unbalanced and the piston will be moved in response to increased average fluid pressure on one face. The output rod 9 will, of course, travel with the piston 10 to provide a typical output function as is conventional in servo actuator devices.

The transducer 3 is preferably an LVPT 15 of the type shown and described in more detail in the above-mentioned copending U.S. patent application, which is incorporated herein by reference. The LVPT 15 includes a pair of primaries 16, 17 and a secondary 18 which are generally circumferentially wound about a bobbin 19. Respective sinusoidally varying constant current excitation signals, which are out of phase with respect to each other by an amount other than zero degrees or 180° and preferably 120°, are supplied to the respective primaries. The excited primaries induce respective magnetic fluxes in a linearly movable magnetically permeable ferromagnetic core 20, which combines the two individual magnetic flux vectors to produce an output flux. The output flux has a phase dependent on the number of turns of the respective primaries cut by or engaged with the core 20, and the output flux induces a return signal having a corresponding phase in the secondary 18. A connector 21 mechanically couples the core 20 with the piston 10 so that the phase of the output flux and, thus, of the return signal will be directly indicative of the position of the piston 10 in the chamber 7 of the servo actuator 2.

To develop the two constant current excitation signals that excite the primaries 16, 17, a conventional clock oscillator 23 may be utilized to produce a clock pulse signal, for example, a square wave signal having a frequency of 1.2 MHz. on the clock output line 24. A divider circuit 25, which is a conventional device, conveniently divides the clock pulse signal or its frequency by five hundred to produce a clock synchronous signal at 2.4 KHz. on line 26 that is coupled to a digital signal splitter 27. The splitter 27 includes three JK flip-flop stages 27a, 27b, 27c, which are coupled in the manner illustrated in FIG. 1 to split the clock synchronous signal into three respective 400 Hz. square wave signals that are out of phase with respect to each other. More specifically, two of the 400 Hz. signals schematically depicted at 28 and 29 are the unfiltered, unamplified excitation signals on lines 30 and 31. These signals are out of phase with respect to each other by 120°, i.e. 60° leading and lagging, respectively, the 400 Hz. reference signal 32, which is applied on line 33. The signals 28, 29 are filtered to sinusoidal form by conventional sinusoidal filters 34, 35, producing sinusoidal signals 28', 29' which are amplified by respective constant current amplifiers 36, 37 to produce the sinusoidal, constant current excitation signals on lines 38, 39 which are coupled to the respective primaries 16, 17. For purposes of description herein the oscillator 23, divider circuit 25, digital signal splitter 27, filters 34, 35 and amplifiers 36, 37 may be considered an excitation circuit portion of the digital circuitry 4.

The digital circuitry 4 also includes a digital phase detector 41, which has phase detector logic 42 and phase counter 43 portions that directly convert the time-based phase modulated return signal on the lines 44 to a digital feedback signal in a binary format on a plurality of parallel lines 45.

A squaring circuit 47 at the input to the phase detector logic 42 includes a pair of back-to-back diodes 48, 49 and a high input impedance operational amplifier 50 that convert the phase modulated return signal to a phase modulated square wave logic signal 51a on line 51. The logic signal, which has the same phase as the return signal, will have distinct high or positive-going portions referred to herein-after as logic 1 and distinct low or relatively negative-going portions referred to hereinafter as logic 0. The phase of the 400 Hz. square wave reference signal, which also has distinct logic 1 and logic 0 portions, is compared with that of the logic signal on line 51 in the phase detector logic 42, and the result of such comparison operates the phase counter 43, which is preferably a multiple, for example, twelve bit binary up/down counter.

More particularly, an AND gate 53 produces a preload signal on line 54 when both the logic signal on line 51 and the reference signal on line 33 are logic 1 to load into the phase counter 43 an offset signal stored in an offset data preset circuit 55. The phase counter 43 may be a twelve bit binary up/down counter, such as, for example, three cascaded Four Bit Binary Counter microcircuits manufactured by RCA under part number CD4029AE, these being coupled in a parallel clocking arrangement. The preset circuit 55 comprises a plurality of switches 56 coupled between a plurality of parallel input lines 57 to the phase counter and a source of reference, preferably ground, potential 58. Therefore, when any switch 56 is respectively opened or closed, the corresponding parallel input line 57 is respectively at logic 1 or logic 0 level; thus, by opening and closing respective switches 56 the offset signal may be established as a binary number having a predetermined value depending on the switches 56. After the offset signal has been loaded into the phase counter 43, an Exclusive OR gate 60 will produce a logic 1 phase gate signal on line 61 when the logic signal on line 51 and the reference signal on line 33 are at opposite logic levels. The duration or period of the phase gate signal is determined by the phase separation of the logic and reference signals.

The phase gate signal is applied to an AND gate 62, which is considered a phase gate that passes a burst of clock pulse signals from the oscillator 23 as a phase count to the clock input 63 of the phase counter 43 to increment or decrement the digital feedback signal produced on the parallel lines 45 at the output of the phase counter. Thus, the phase count is directly indicative of the phase separation, if any, of the logic and reference signals. If the logic and reference signals are directly in phase, which will occur when the core 20 in the LVPT 15 is centered between the primaries 16, 17, the Exclusive OR gate 60 and the phase gate 62 will not be satisfied and the feedback signal on the parallel lines 45 will have the same value as the offset signal from the offset data preset circuit 55, which, accordingly, represents the value of the feedback signal when the core is in a null position.

Part of the phase detector logic 42 includes a direct line connection 64 that provides the reference signal to the up/down control input 65 of the phase counter 43. When the reference signal is logic 1 and a phase count is supplied to the clock input 63 of the phase counter 43, the latter will increment its count level and, thus, the feedback signal on the parallel lines 45 by an amount determined by the phase count; and when the reference signal is logic 0, the phase counter will decrement its count level by the phase count value. For example, referring to the graphs of FIGS. 2A–2G, assume that the return signal from the LVPT and, thus, the logic signal 51a (FIG. 2B) on line 51 leads the reference signal 32 (FIG. 2A) by 18°, as is indicated at lead amount 66 in FIG. 2B. Between times $t_0$ and $t_1$ a logic 1 preload signal 67 (FIG. 2C) causes the phase counter 43 to load in the offset signal of, for example, a digital value of 250, as is indicated in block 68 of FIG. 2G. At time $t_1$ the logic signal 51a becomes logic 0 whereupon the Exclusive OR gate 60 produces the phase gate signal 60a (FIG. 2E), and a burst of clock pulse signals, the phase count 69 (FIG. 2F) from the oscillator 23, is directed to the clock input 63 of the phase counter 43. Inasmuch as the reference signal 32 is logic 1 while this phase count is produced, the phase counter will increment its count level, previously 250 due to the offset signal, by the phase count amount. In this example, the phase count amount or value is 150, i.e. 18° phase separation, divided by 360° total degrees, times 3,000, the number of clock pulse signals in a 400 Hz. reference signal period. Therefore, at time $t_2$ the phase counter 43 reaches a count level of 400, as is shown in block 70 of FIG. 2G.

A NOR gate 72 in the phase detector logic 42 determines the validity of the feedback signal on the parallel lines 45 from the phase counter 43 and, accordingly, produces a phase data valid signal on line 73 when the feedback signal is valid. More specifically, the NOR gate 72 is enabled to produce the logic 1 data valid signal, e.g. shown at 74 in the graph of FIG. 2D, when both the reference and logic signals are at logic 0 and this will occur only after two conditions are first satisfied. Namely, both the reference and logic signals must first be at logic 1 levels to satisfy the AND gate 53 to produce a preload signal to load the offset signal into the phase counter 43, and subsequently both the reference and logic signals must drop to logic 0, either after a phase count has occurred if they are out of phase or without a phase count having occurred if they are directly in phase.

As is shown at 60a', 69', and 68' in FIGS. 2E, 2F and 2G, a logic 1 phase gate signal will allow a phase count to be delivered to the clock input 63 of the phase counter 43 for decrementing the count level thereof between times $t_3$ and $t_4$ since the logic signal goes to logic 1 at time $t_3$ 18° before the reference signal becomes logic 1 at time $t_4$. However, such decrementing of the counter to the value of 250 will not occur during nor be followed by a data valid signal, and, therefore, such decrementing is immaterial and will not affect the digital resultant signal delivered by the digital circuitry 4 to the PWM 5. Moreover, at time $t_4$ the AND gate 53 produces another logic 1 preload signal 67' (FIG. 2C) to load the offset signal into the phase counter 43 to repeat the just-described operation of the digital phase detector 41 to produce an updated digital feedback signal on the parallel lines 45 directly indicative of the position of the core 20 in the LVPT 15 and the piston 10 in the servo actuator 2.

The same type of operation of the digital phase detector 41 occurs when the phase of the resultant signal and logic signal lags the reference signal; however, in such case the phase counter 43 would be decremented from the count level produced by the offset signal. Furthermore, it will be appreciated that the value of the feedback signal will be the same as the offset signal whenever the core 20 is in a null position so that the logic and reference signals are in phase, and that value may be varied, as desired, by adjustment of the switches 56 in the offset circuit 55.

The digital circuitry 4 also includes a digital position command unit 75, such as, for example, a conventional central processing unit, a computer or a computer connection, manual switch mechanisms, etc., which produces a binary command signal on the parallel command lines 76; and a conventional summing junction 77, such as, for example, a multiple bit, e.g. 12 by 12 bit, parallel adder, a conventional device, which combines the command signal with the feedback signal on parallel lines 45 from the digital phase detector 41 to produce a binary resultant signal on parallel lines 78. The parallel adder may be three Four-Bit Full Adder microcircuits, such as those manufactured by RCA under part number CD4008AE.

The resultant signal thus represents a combination of the feedback signal and the command signal. The feedback signal is directly indicative of the actual position of the servo actuator piston 10 relative to a null position thereof, which is represented by the value of the offset signal, and the command signal is indicative of a desired position of the servo actuator piston.

The lines 78 are coupled to a conventional 12 bit data latch 80, which normally remains closed to incoming data unless it is enabled by a logic 1 system data valid signal on line 81 from a validity AND gate 82. The latch 80 may be, for example, three Quad Clocked D Latch microcircuits such as manufactured by RCA under part number CD4042AE coupled with a common latch control. The validity gate 82 is coupled to the line 73 to receive the phase data valid signal from the phase detector logic 42, and a line 83 also couples the validity gate 82 to the digital position command unit 75 to receive a command data valid signal, which is a logic 1 signal produced in a conventional manner by the digital position command unit whenever the command signal produced on the parallel command lines 76 is a valid one. Thus, for example, the logic 1 command data valid signal is removed from the line 83 whenever the digital position command unit 75 changes the value of the command signal, and the logic 1 command data valid signal is applied to the line 83 as soon as the command signal is fixed on the lines 76. Accordingly, whenever the feedback signal on the parallel lines 45 and the command signal on the parallel command lines 76 are valid ones, the respective logic 1 data valid signals are produced on the lines 73 and 83 to satisfy the validity gate 82 which then enables the data latch 80. When the data latch 80 is enabled it will receive the binary resultant signals on parallel lines 78 and when it is disabled it will continue to store that binary resultant signal. When the data latch is later enabled again it will receive the new binary resultant signal then on the parallel lines 78, as is conventional.

The value of the resultant signal when the position 10 is at the relative position in the servo actuator 2 commanded by the digital position command unit 75 will be a constant selected value of, for example, 750, which is determined in a manner to be described further below. However, it is noted here that when the value of the resultant signal is such constant value, the pulse width modulated control signal on lines 12 and 13 from the PWM 5 will be balanced and the servo actuator piston will remain in a relatively fixed position.

For example, assuming that the servo actuator piston 10 is at its null position such that no phase count is delivered to the phase counter 43 and that the value of the offset signal in the offset data preset circuit 55 is 250, the value of the feedback signal on the parallel lines 45 when the logic 1 phase data valid signal on line 74 is produced will also be 250. Therefore, the value of the command signal on the parallel command lines 76 from the digital position command unit 75 must be 500 in order to assure that the resultant signal produced by the summing junction 77 will have a value of 750 to maintain the pulse width modulated control signal balanced, which in turn holds the piston at the null position. Accordingly, the value 500 produced by the command unit 75 will represent a command signal calling for the piston 10 assume its effective null position in the servo actuator.

Similarly, when the value of the command signal is reduced, for example, to 350, while the piston 10 is instantaneously at its null position, the value of the resultant signal will drop to 600, i.e. the command signal value of 350 plus the offset signal of 250, which will cause an unbalanced pulse width modulated control signal that will cause motion of the servo actuator piston until the value of the phase count in the digital phase detector 41 plus the value of the offset signal plus the value of the command signal equals 750. At this point the pulse width modulated control signal will again be balanced and the servo actuator piston will be held at a relatively fixed position displaced from its null position such that the core 20 in the LVPT 15 is similarly displaced whereby the return signal on lines 44 and the logic signal on line 51 in the digital phase detector 41 will lead the reference signal on line 33 by 18° to produce a phase count of 150, as previously described.

Moreover, by increasing the valve of the command signal, the pulse width modulated control signal will cause the servo actuator piston to move in the relatively opposite direction on the opposite side of its null position such that the return signal from the LVPT 15 and the logic signal in the phase detector logic 42 will lag the reference signal so that the phase count will be decremented from the offset signal of the offset data present circuit 55 by the phase counter 43. As above, when the piston 10 achieves a position commanded by the command signal, the value of the summed feedback and command signals will again equal the selected constant value of 750.

By changing the value of the offset signal in the offset data preset circuit 55 the effective null position of the piston 10 and core 20 may be changed from the previously described absolute null position at which the core 20 was centered between the primaries 16, 17. Thus, for example, assume the value of the offset signal is reduced to 200 and the digital position command unit 75 is producing a command signal having a value of 500, which is the previously mentioned command signal value that the unit 75 knows will ordinarily command the piston to assume an effective null position. The piston and core would then have to be displaced from the previous null position a distance such that the phase of the return and logic signals leads the reference signal phase an amount whereby a phase count of 50 is delivered to increment the reduced offset signal of 200 in the phase counter to produce a feedback signal having the value of 250. After such movement of the core 20 is effected by the system 1, the value of the resultant signal will be 750 again.

The PWM 5 includes a PWM counter 85, an output device in the form of a set-reset flip-flop 86, and a sync pulse generator 87. The PWM counter 85 is preferably a 12 bit binary down counter that has a plurality of parallel jam inputs 88 to receive the binary resultant signal stored in the data latch 80 is shifted relation such that the value of the resultant signal delivered to the jam input 88 is effectively doubled. The counter 85 also has a load input 89, which periodically receives a sync pulse from the sync pulse generator 87 to strobe the doubled or shifted resultant signal from the data latch into the counter, and a clock signal input 90, which receives a PWM clock pulse signal with pulses produced at a frequency that is a multiple of the frequency at which the sync pulses are produced. The pulses of the PWM clock pulses signal are counted in a downward direction by the counter 85 decrementing the same until it reaches a zero level at which time the counter produces a borrow signal at its output 91. The PWM counter 85 may be composed of three Four-Bit Binary Counter microcircuits, RCA part number CD4029AE, coupled in conventional manner to have jam, load, and clock inputs and a borrow output, as illustrated and described.

The sync pulse produced by the sync pulse generator 87 and the PWM clock pulse signal delivered to the clock input 90 of the counter 85 may be independent of the clock pulse signal produced by the oscillator 23 in the digital phase detector 41, with the only constraint being that the PWM clock pulse signal have a frequency that is preferably a whole number multiple of the sync pulse signal. However, for convenience, the 400 Hz. reference signal from line 33 may be coupled as an input to the sync pulse generator 87 to effect generation of brief logic 1 sync pulse signals at the 400 Hz. frequency. Moreover, the clock pulse signal on line 24 from the oscillator 23 may be applied directly to the sync pulse generator for synchronization purposes and to the clock input 90 of the counter 85 as the PWM clock pulse signal. Thus, assuming that the clock pulse signal has a frequency of 1.2 MHz., such signal is a multiple of 3,000 times the 400 Hz. frequency of which the sync pulse signal is produced.

In sync pulse generator 87, the 400 Hz. reference pulse from the line 33 in the digital phase detector 41 is received at line 33a and the clock pulse signal from the line 24 in the digital phase detector is received at line 24a. The sync pulse generator 87 includes a pair of JK flip-flop stages 92, 93, an inverting amplifier 94, and an output AND gate 95 coupled in the manner illustrated to produce from the reference and clock pulse signals a single logic 1 sync pulse signal on the line 96 each time the reference signal 32 (FIG. 3A) becomes logic 1. The leading or positive going edge of sync pulse 97 (FIG. 3C) is directly synchronized with the leading edge of the first clock pulse 98 (FIG. 3B) produced after the positive going leading edge of the reference signal. The negative going edge is synchronized with the leading positive going edge of the second clock pulse after the positive going edge of the reference signal. The duration of the logic 1 sync pulse 97 is equal to that of one complete cycle or period of the clock pulse 98. The time axis in FIGS. 3A–3C is the same as that of FIGS. 2A–2G for convenience, but the actual pulse widths of the clock pulses and sync pulse signals in FIGS. 3B and 3C are exaggerated for purposes of illustration.

The flip-flop 86 produces the control signal on lines 12, 13, respectively, to energize the electrohydraulic valve 11 in the servo actuator 2. A positive extend signal, whereby the line 12 is relatively positive, causes the electrohydraulic valve to extend the piston 10, e.g. to the right as illustrated in FIG. 1. Similarly, a positive retract signal, whereby the line 13 is relatively positive, causes the electrohydraulic valve 11 to retract the piston 10, e.g. to the left. Of course, as is conventional, if the control signal is balanced whereby the respective extend and retract signal portions thereof are relatively positive for equal and opposite durations, the electrohydraulic valve will not move the piston 10 in the servo actuator.

Accordingly, when the sync pulse signal from the sync pulse generator 87 strobes the doubled resultant signal into the PWM counter 85 to set the same at a set count level, such sync pulse signal also sets the flip-flop 86 whereby the Q output thereof is at logic 1 and $\bar{Q}$ output is at logic 0. The amplifiers 99 and 100 then amplify the signal outputs from the flip-flop 86, to produce the control signal in a manner such that the extend line 12 is relatively positive with respect to the retract line 13. At the same time the clock pulse signal is delivered to the clock input 90 of the counter 85 to decrement the same from the set count level, and when the counter achieves a zero count level or other predetermined count level, a borrow signal is produced on the output line 91 to reset the flip-flop 86 whereupon the Q and $\bar{Q}$ outputs respectively switch to logic 0 and logic 1 levels. The amplifiers 99 and 100 then amplify these output signals to produce the control signal in a manner such that the retract line 13 is positive with respect to the extend line 12.

As long as the value of the doubled resultant signal is one half the ratio of the clock pulse signal frequency (1.2 MHz.) to the reference signal frequency (400 Hz.), the control signal will be balanced, thus calling for no motion of the servo actuator piston 10. One half the indicated ratio in the illustrative embodiment described herein is 1,500, and since the signal delivered from the latch 80 to the PWM counter 85 is twice the resultant signal, the constant value of the latter to achieve a holding action of the piston 10 would be 750, as described above. Accordingly, the constant value of the resultant signal to obtain such holding action should be one fourth the indicated ratio, and it will be appreciated that such constant value may be varied simply by varying such ratio.

If the value of the resultant signal on the parallel lines 78 is other than 750, say, for example 600, the control signal will be unbalanced. Specifically, the value of the doubled resultant signal strobed into the PWM counter 85 from the data latch 80 to produce a set count level in the counter would be 1,200 at which point the flip-flop 86 would be set. The clock pulse signal then counts the counter 85 down for 1,200 counts or pulses at which time a borrow signal is produced to reset the flip-flop 86. The flip-flop 86 then remains in its reset state for 1,800 counts or pulses of the clock pulse signal, i.e. until the next sync pulse signal is produced. Therefore, in each 400 Hz. period of the reference and sync pulse signals the control signal will be produced in an unbalanced manner such that the retract line 13 is positive for a longer duration than the extend line 12. The piston 10 will then be retracted in the servo actuator 2 a distance sufficient to cause the return signal from the LVPT 15 and the logic signal to lead the reference signal by an amount such that the phase count in the digital phase detector 41 and the feedback and resultant signals will be increased by a valve of 150. After such increase, the resultant signal will equal 750, whereupon the control signal will be balanced and the piston 10 will be held in a fixed position. Similarly, when the resultant signal exceeds a value of 750, i.e. one fourth the ratio of the frequencies of the clock pulse signal to the sync pulse signal, the pulse width modulation of the control signal will become unbalanced in the opposite direction tending to cause extension of the piston 10 until the feedback signal produced by the phase counter 43 is reduced sufficiently that the resultant signal will be brought back to a value of 750.

Thus, it will be clear that the pulse width modulator digital servo system 1 of the invention directly converts a highly resolved analog signal that is phase modulated with respect to a position or displacement parameter of the servo actuator to digital information that is relatively highly resolved according to a clock pulse signal frequency. The digital information may be directly interfaced with digital command and/or monitoring equipment. Moreover, the digital information as modified, for example, by digital command information is directly converted to a pulse width modulated control signal, which also is relatively highly resolved according to a clock pulse signal frequency, for directly controlling the indicated parameter of the servo actuator. Additionally, the system requires a minimum number of connections to the transducer and servo actuator, is relatively immune to noise since position sensing is effected as a phase relation, and may be conveniently multiplexed or the like since information is carried in digital format.

The embodiments of the invention in which an exclusive property or privilege is claimed are defined as follows:

1. A pulse width modulator digital servo system, comprising
   servo means having a changeable physical parameter for adjusting such parameter in response to a pulse width modulated control signal,
   transducer means for producing a transducer signal indicative of the actual state of such parameter,
   digital means coupled to said transducer means for producing digital information indicative of the actual state of such parameter and a desired state thereof, including
   detector means for directly converting such transducer signal to a digital feedback signal, and
   command means for combining command information indicative of the desired state of such parameter with such feedback signal to produce such digital information, and
   pulse width modulating output means coupled to said digital means and to said servo means for developing such control signal and pulse width modulating the same in accordance with such digital information.

2. The system of claim 1, wherein said command means comprises a summing junction.

3. The system of claim 1, wherein said command means further comprises means for generating such command information.

4. The system of claim 3, wherein said command means comprises a summing junction.

5. The system of claim 1, wherein said transducer means comprises linear variable phase transformer means for phase modulating such transducer signal with respect to such parameter.

6. The system of claim 5, wherein said detector means comprises digital phase detector means for developing a digital feedback signal in binary format indicative of such physical parameter.

7. The system of claim 1, wherein said digital means comprises means for periodically updating such digital information.

8. A pulse width modulator for producing a pulse width modulated output signal in response to a digital input, comprising
   counter means for counting to a predetermined count level,
   set means for periodically setting said counter means to a set count level representative of such digital input,
   pulse generator means for delivering a series of pulses to said counter means for counting thereof from such set count level to such predetermined count level, and
   pulse width modulating output means for producing an output signal that is pulse width modulated in accordance with the setting of said counter means and the achieving of such predetermined count level thereby.

9. The modulator of claim 8, wherein said counter means comprises a down counter.

10. The modulator of claim 8, wherein said output means comprises a set-reset flip-flop.

11. The modulator of claim 8, further comprising servo actuator means coupled to said output means for assuming a physical positional relationship in response to such pulse width modulated output signal.

12. The modulator of claim 11, wherein said servo actuator means comprises a relatively movable member and an electrohydraulic valve responsive to such pulse width modulated output signal to control the position of said relatively movable member.

13. The modulator of claim 11, further comprising transducer means responsive to said servo actuator means for developing feedback signals indicative of the relative position thereof and digital means for developing such set count level representative of such feedback signal.

14. A pulse width modulator digital servo system, comprising
   servo means having a changeable physical parameter for adjusting such parameter in response to a pulse width modulated control signal,
   transducer means for producing a transducer signal indicative of the actual state of such parameter,
   digital means coupled to said transducer means for producing digital information indicative of the actual state of such parameter and a desired state thereof, including
   detector means for directly converting such transducer signal to a digital feedback signal,
   command means for combining command information indicative of the desired state of such parameter with such feedback signal to produce such digital information, said command means comprising a summing junction, and such feedback signal and such command information being in binary format and said summing junction comprising multiple bit parallel adder means for adding such binary feedback signal and binary command information to produce such digital information also in a binary format as a resultant signal, and pulse width modulating output means coupled to said digital means and to said servo means for developing such control signal and pulse width modulating the same in accordance with such digital information.

15. The system of claim 14, further comprising latch circuit means for storing such resultant signal therein and delivering the same to said pulse width modulating output means, and means for opening said latch circuit means when an updated resultant signal is produced by said parallel adder means.

16. A pulse width modulator digital servo system, comprising servo means having a changeable physical parameter for adjusting such parameter in response to a pulse width modulated control signal, transducer means for producing a transducer signal indicative of the actual state of such parameter, digital means coupled to said transducer means for producing digital information indicative of the actual state of such parameter and a desired state thereof, including detector means for directly converting such transducer signal to a digital feedback signal, and command means for combining command information indicative of the desired state of such parameter with such feedback signal to produce such digital information, pulse width modulating output means coupled to said digital means and to said servo means for developing such control signal and pulse width modulating the same in accordance with such digital information, and latch circuit means for storing such digital information produced by said command means and delivering such stored digital information to said pulse width modulating output means, and means for periodically opening said latch circuit means to receive updated digital information.

17. A pulse width modulator digital servo system, comprising servo means having a changeable physical parameter for adjusting such parameter in response to a pulse width modulated control signal, transducer means for producing a transducer signal indicative of the actual state of such parameter, digital means coupled to said transducer means for producing digital information indicative of the actual state of such parameter and a desired state thereof, including detector means for directly converting such transducer signal to a digital feedback signal, command means for combining command information indicative of the desired state of such parameter with such feedback signal to produce such digital information, said command means comprising a summing junction means for generating such command information, and such feedback signal and such command information being in digital format and said summing junction means comprising a multiple bit parallel adder means for adding such binary feedback signal and binary command information to produce such digital information also in a binary format as a resultant signal, and pulse width modulating output means coupled to said digital means and to said servo means for developing such control signal and pulse width modulating the same in accordance with such digital information.

18. The system of claim 17, further comprising latch circuit means for storing such resultant signal therein and delivering the same to said pulse width modulating output means, and means for opening said latch circuit means when an updated resultant signal is produced by said parallel adder means.

19. The system of claim 17, wherein said detector means comprises offset means for modifying such digital feedback signal by a predetermined offset amount.

20. The system of claim 19, wherein said servo means includes a movable member and such changeable physical parameter results from displacement of said movable member in said servo means, and wherein the value of such offset amount determines an effective null position of said movable member in said servo means.

21. The system of claim 20, wherein said pulse width modulating output means develops a balanced control signal when such binary digital information resultant signal has a predetermined value, wherein such digital command information has a predetermined value that commands positioning of said movable member to an effective null position in said servo means, and wherein the value of such offset amount accordingly varies the effective null position of said movable member in said servo means.

22. A pulse width modulator digital servo system, comprising servo means having a changeable physical parameter for adjusting such parameter in response to a pulse width modulated control signal, transducer means for producing a transducer signal indicative of the actual state of such parameter, a digital means coupled to said transducer means for producing digital information indicative of the actual state of such parameter and a desired state thereof, including detector means for directly converting such transducer signal to a digital feedback signal, and command means for combining command information indicative of the desired state of such parameter with such feedback signal to produce such digital information, said command means comprising summing junction means for generating such command information, and pulse width modulating output means coupled to said digital means and to said servo means for developing such control signal and pulse width modulating the same in accordance with such digital information, said pulse width modulating output means developing a balanced control signal when such digital information produced by said command means is at a predetermined value and an unbalanced control signal when such digital information is other than such predetermined value.

23. A pulse width modulator digital servo system, comprising servo means having a changeable physical parameter for adjusting such parameter in response to a pulse width modulated control signal, transducer means for producing a transducer signal indicative of the actual state of such parameter, digital means coupled to said transducer means for producing digital information indicative of the actual state of such parameter and a desired state thereof, including detector means for directly converting such transducer signal to a digital feedback signal, and command means for combining command information indicative of the desired state of such parameter with such feedback signal to produce such digital information, and pulse width modulating output means coupled to said digital means and to said servo means for developing such control signal and pulse width modulating the same in accordance with such digital information, said servo means comprising a servo actuator including movable means for assuming a physical positional relationship in said servo actuator in response to fluid pressure therein, such parameter being such positional relationship, and electrohydraulic valve means responsive to such pulse width modulated control signal to control the fluid pressure in said servo actuator and, thus, the position of said movable means.

24. The system of claim 23, wherein said pulse width modulating output means comprises counter means for counting to a predetermined count level, set means for periodically setting said counter means to a set count level representative of such digital information, pulse generator means for delivering a series of pulses to said counter means for counting thereof from such set count level to such predetermined count level, and flip-flop output means for producing such control signal and modulating the same in accordance with the setting of said counter means and the achieving of such predetermined count level thereby.

25. The system of claim 24, wherein said transducer means comprises means responsive to said servo actuator for developing such transducer signal as a time based signal indicative of such positional relationship of said movable means.

26. The system of claim 25, wherein said transducer means comprises a linear variable phase transformer means for producing a phase modulated signal indicative of such positional relationship and wherein said detector means comprises phase detector means for producing from such phase modulated signal a feedback signal in a digital format.

27. The system of claim 26, wherein said digital means includes means for delivering such digital information including such feedback signal to said counter means as such set count level.

28. The system of claim 26, wherein said command means comprises command signal generator means for producing a command signal representative of a desired position of said movable means and summing means for combining such command and feedback signals to produce a resultant signal from which such set count level is derived.

29. The system of claim 28, wherein said digital means further comprises means for shifting such resultant signal to double the same to produce such set count level.

30. The system of claim 28, wherein said summing means comprises a binary multiple bit parallel adder means for producing such resultant signal in binary format, and further comprising means for shifting such resultant signal in binary format and delivering the same as such set count level to said counter means.

31. The system of claim 28, wherein said set means comprises a sync pulse generator means for producing a brief sync pulse at a first frequency to set said counter means at such set count level, and further comprising clock pulse generator means for producing a plurality of clock pulse signals at a second frequency that is a whole number multiple of such first frequency, whereby such pulse width modulated control signal is balanced when the value of such set count level is one half of such multiple and is unbalanced when the set count level is other than one half of such multiple.

32. A pulse width modulator digital servo system, comprising servo means having a changeable physical parameter for adjusting such parameter in response to a pulse width modulated control signal, transducer means for producing a transducer signal indicative of the actual state of such parameter, said transducer means comprising linear variable phase transformer means for phase modulating such transducer signal with respect to such parameter, digital means coupled to said transducer means for producing digital information indicative of the actual state of such parameter and a desired state thereof, including detector means for directly converting such transducer signal to a digital feedback signal, said detector means comprising digital phase detector means for developing a digital feedback signal in binary format indicative of such physical parameter, and command means for combining command information indicative of the desired state of such parameter with such feedback signal to produce such digital information, and pulse width modulating output means coupled to said digital means and to said servo means for developing such control signal and pulse width modulating the same in accordance with such digital information, said servo means including a movable member and such physical parameter resulting from displacement of said movable member and said servo means, such digital feedback signal being indicative of the actual position of said movable member in said servo means, and such command information being indicative of the desired position of said movable member in said servo means.

33. The system of claim 32, wherein said pulse width modulating output means produces a balanced control signal when such digital information is a predetermined value and an unbalanced signal to effect movement of said movable member in said servo means when such digital information is at other than such predetermined value.

34. A pulse width modulator for producing a pulse width modulated output signal in response to a digital input, comprising counter means for counting to a predetermined count level, said counter means including a plurality of jam inputs, set means for periodically setting said counter means to a set count level representative of such digital input, said set means comprising means for operating said counter means to strobe input information into said counter means to set the same at such set count level, pulse generator means for delivering a series of pulses to said counter means for counting thereof from such set count level to such predetermined count level, and pulse width modulating output means for producing an output signal that is pulse width modulated in accordance with the setting of said counter means and the achieving of such predetermined count level thereby.

35. The modulator of claim 34, wherein said output means comprises a set-reset flip-flop.

36. The modulator of claim 34, wherein said output means comprises a set-reset flip-flop, and said counter means comprises a multiple bit binary down counter that produces a borrow signal upon achieving such predetermined count level, and means for coupling said counter means and said set means to said flip-flop for setting and resetting the latter, respectively, upon setting of said counter means and upon production of such borrow signal.

37. A pulse width modulator for producing a pulse width modulated output signal in response to a digital input, comprising counter means for counting to a predetermined count level, set means for periodically setting said counter means to a set count level representative of such digital input, said set means comprising a sync pulse generator that produces a brief sync pulse at a first frequency to set said counter means at such set count level, pulse generator means for delivering a series of pulses to said counter means for counting thereof from such set count level to such predetermined count level, and pulse width modulating output means for producing an output signal that is pulse width modulated in accordance with the setting of said counter means and the achieving of such predetermined count level thereby.

38. The modulator of claim 37, further comprising clock pulse generator means for producing a plurality of clock pulse signals at a second frequency that is a whole number multiple of such first frequency, whereby such pulse width modulated output signal is balanced when the value of such set count level is one half of such multiple and is unbalanced when the set count level is other than one half of such multiple.

39. A pulse width modulator for producing a pulse width modulated output signal in response to a digital input, comprising counter means for counting to a predetermined count level, set means for periodically setting said counter means to a set count level representative of such digital input, pulse generator means for delivering a series of pulses to said counter means for counting thereof from such set count level to such predetermined count level, and pulse width modulating output means for producing an output signal that is pulse width modulated in accordance with the setting of said counter means and the achieving of such predetermined count level thereby, and further comprising servo actuator means coupled to said output means for assuming a physical positional relationship in response to such pulse width modulated output signal, and transducer means responsive to said servo actuator means for developing feedback signals indicative of the relative position thereof and digital means for developing such set count level representative of such feedback signal.

40. The modulator of claim 39, wherein said digital means further comprises command signal generator means for producing a command signal representative of a desired position of said servo actuator means and combining means for combining such command and feedback signals to produce a resultant signal from which such set count level is derived.

41. The modulator of claim 40, wherein said combining means comprises a binary multiple bit parallel adder for producing such resultant signal in binary format, and further comprising means for shifting such resultant signal in binary format and delivering the same as such set count level to said counter means.

42. A pulse width modulator digital servo system, comprising servo means having a changeable physical parameter for adjusting such parameter in response to a pulse width modulated control signal, transducer means for producing a transducer signal indicative of the actual state of such parameter, digital means coupled to said transducer means for producing digital information indicative of the actual state of such parameter and a desired state thereof, including detector means for directly converting such transducer signal to a digital feedback signal, and command means for combining command information indicative of the desired state of such parameter with such feedback signal to produce such digital information, and pulse width modulating output means coupled to said digital means and to said servo means for developing such control signal and pulse width modulating the same in accordance with such digital information, said pulse width modulating means comprising counter means for counting to a predetermined count level, set means for periodically setting said counter means to a set count level representative of such digital information, pulse generator means for delivering a series of pulses to said counter means for counting thereof from such set count level to such predetermined count level, and flip-flop output means for producing such control signal and modulating the same in accordance with the setting of said counter means and the achieving of such predetermined count level thereby.

* * * * *